(12) United States Patent
Murata et al.

(10) Patent No.: US 11,743,676 B2
(45) Date of Patent: Aug. 29, 2023

(54) INFORMATION PROCESSING APPARATUS, INFORMATION PROCESSING METHOD, AND PROGRAM

(71) Applicant: Sony Corporation, Tokyo (JP)

(72) Inventors: Naoki Murata, Tokyo (JP); Yuhki Mitsufuji, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/269,218

(22) PCT Filed: Jun. 28, 2019

(86) PCT No.: PCT/JP2019/025920
§ 371 (c)(1),
(2) Date: Feb. 17, 2021

(87) PCT Pub. No.: WO2020/039748
PCT Pub. Date: Feb. 27, 2020

(65) Prior Publication Data
US 2021/0314724 A1   Oct. 7, 2021

(30) Foreign Application Priority Data
Aug. 24, 2018  (JP) ................. 2018-157657

(51) Int. Cl.
*H04S 7/00*       (2006.01)
*G06T 11/00*      (2006.01)
(Continued)

(52) U.S. Cl.
CPC ............... *H04S 7/40* (2013.01); *G06T 11/00* (2013.01); *H04R 5/02* (2013.01)

(58) Field of Classification Search
CPC .............. H04S 7/40; G06T 11/00; H04R 5/02
(Continued)

(56) References Cited

U.S. PATENT DOCUMENTS

| 5,619,220 A | 4/1997 | Tomita et al. |
| 2005/0147257 A1* | 7/2005 | Melchior ............. H04N 5/2224 |
| | | 381/310 |
| 2009/0182564 A1 | 7/2009 | Beack et al. |

FOREIGN PATENT DOCUMENTS

| JP | H07-107600 A | 4/1995 |
| JP | 2006-121125 A | 5/2006 |

(Continued)

OTHER PUBLICATIONS

International Search Report and English translation thereof dated Sep. 17, 2019 in connection with International Application No. PCT/JP2019/025920.
(Continued)

*Primary Examiner* — Vivian C Chin
*Assistant Examiner* — Douglas J Suthers
(74) *Attorney, Agent, or Firm* — Wolf, Greenfield & Sacks, P.C.

(57) ABSTRACT

Provided is an information processing apparatus including: a speaker array that includes a plurality of speakers, and performs wavefront synthesis by using an output of the plurality of speakers; and a presentation unit that presents visual information indicating a state of waves on a wavefront formed in the wavefront synthesis, or presents visual information based on positional information of a virtual sound image that has been formed in a position that is different from a vicinity of the speaker array in the wavefront synthesis.

13 Claims, 13 Drawing Sheets

(51) Int. Cl.
*H04S 5/02* (2006.01)
*H04R 5/02* (2006.01)

(58) Field of Classification Search
USPC .......................................... 381/307
See application file for complete search history.

(56) References Cited

FOREIGN PATENT DOCUMENTS

| | | | | |
|---|---|---|---|---|
| JP | 2006121125 A | * | 5/2006 | .............. H04R 1/40 |
| JP | 2015-152680 A | | 8/2015 | |
| JP | 2015-188179 A | | 10/2015 | |

OTHER PUBLICATIONS

Otani, [Invited lecture] Auralization—Problems and Prospects. IEICE Technical Report. Dec. 5, 2014;114(358):89-96.
International Written Opinion and English translation thereof dated Sep. 17, 2019 in connection with International Application No. PCT/JP2019/025920.
International Preliminary Report on Patentability and English translation thereof dated Mar. 11, 2021 in connection with International Application No. PCT/JP2019/025920.

* cited by examiner

FIG. 1
A
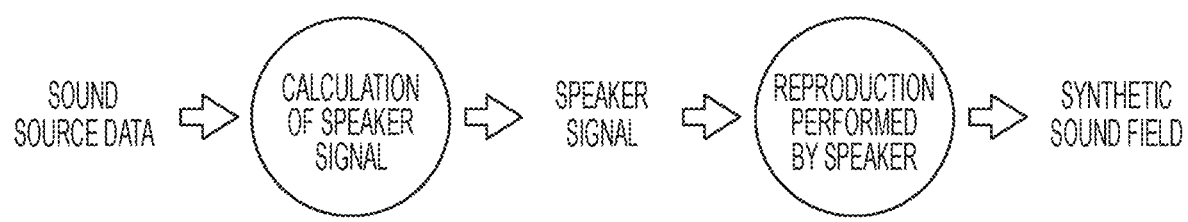
B
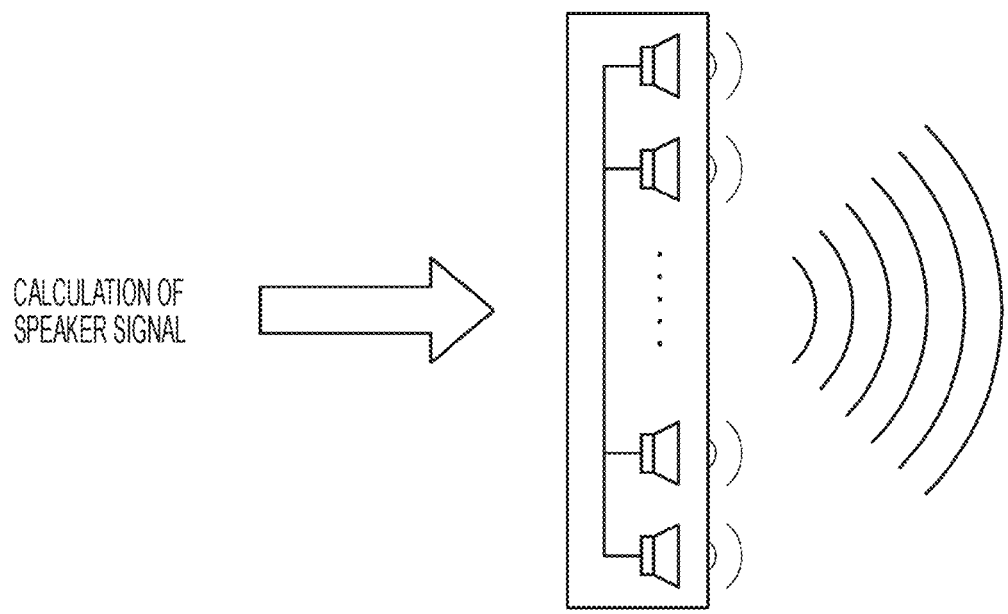

FIG. 2
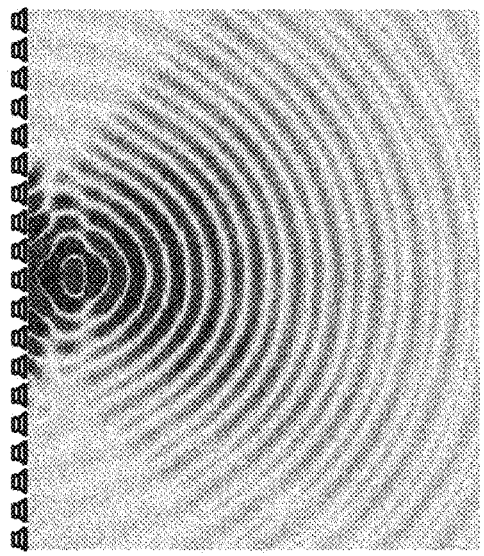
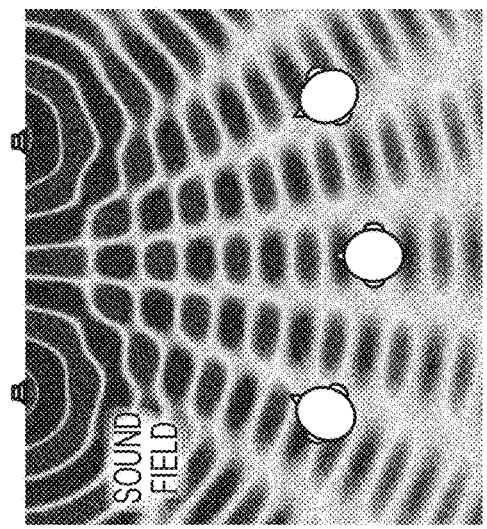
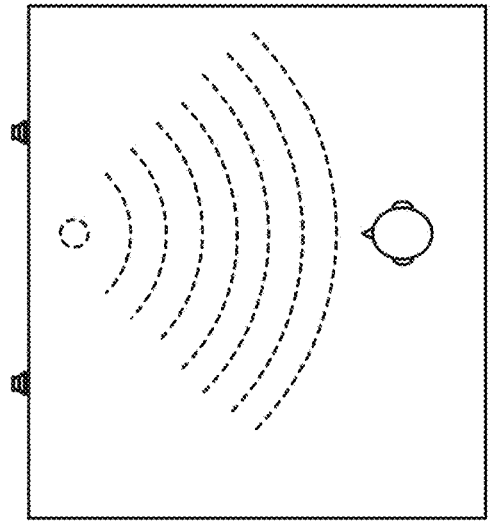

FIG. 6
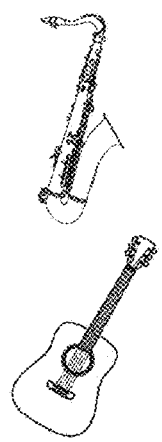
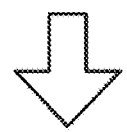
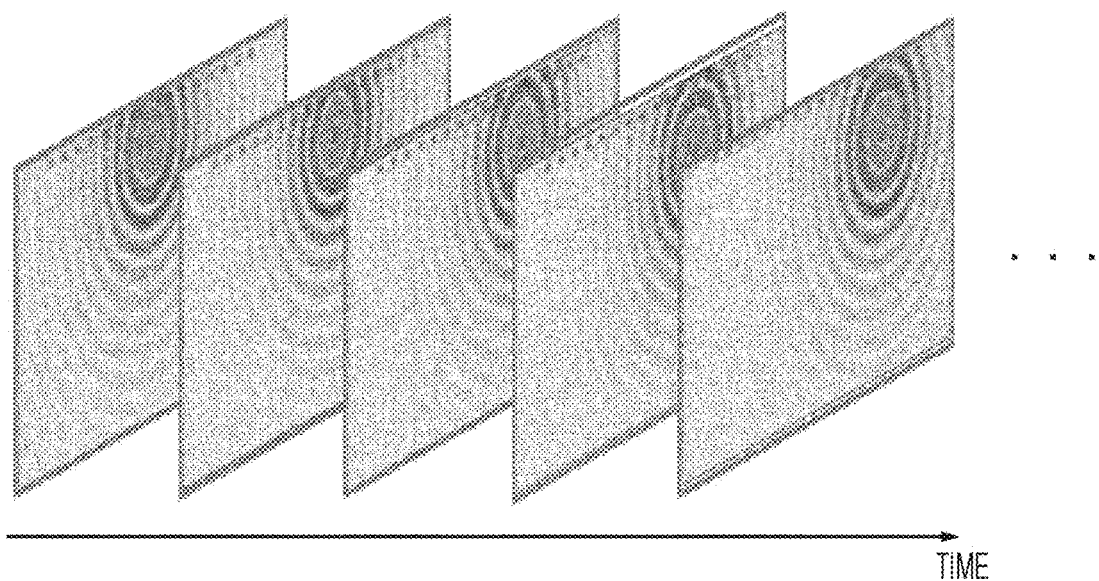

INFORMATION PROCESSING APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2019/025920, filed in the Japanese Patent Office as a Receiving Office on Jun. 28, 2019, which claims priority to Japanese Patent Application Number JP2018-157657, filed in the Japanese Patent Office on Aug. 24, 2018, each of which is hereby incorporated by reference in its entirety.

TECHNICAL FIELD

The present disclosure relates to an information processing apparatus, an information processing method, and a program.

BACKGROUND ART

An apparatus that displays, on a display, a virtual sound image that has been set by an acoustic system has been described (see, for example, Patent Documents 1 and 2).

CITATION LIST

Patent Document

Patent Document 1: Japanese Patent Application Laid-Open No. 2013-051686
Patent Document 2: Japanese Patent Application Laid-Open No. 2011-259298

SUMMARY OF THE INVENTION

Problems to be Solved by the Invention

However, in the techniques described in Patent Documents 1 and 2, a virtual sound image is displayed on a display or a three-dimensional video display device, and therefore there is a limit to a visual effect that can be provided to a user.

It is an object of the present disclosure to provide an information processing apparatus, an information processing method, and a program that are capable of presenting a listener (a user) with an acoustic visual effect with a more satisfactory realistic feeling or the like.

Solutions to Problems

The present disclosure is, for example,
an information processing apparatus including:
a speaker array that includes a plurality of speakers, and performs wavefront synthesis by using an output of the plurality of speakers; and
a presentation unit that presents visual information indicating a state of waves on a wavefront formed in the wavefront synthesis, or presents visual information based on positional information of a virtual sound image that has been formed in a position that is different from a vicinity of the speaker array in the wavefront synthesis.

The present disclosure is, for example,
an information processing method including:
performing, by a speaker array including a plurality of speakers, wavefront synthesis by using an output of the plurality of speakers; and
presenting, by a presentation unit, visual information indicating a state of waves on a wavefront formed in the wavefront synthesis, or presenting visual information based on positional information of a virtual sound image that has been formed in a position that is different from a vicinity of the speaker array in the wavefront synthesis.

The present disclosure is, for example,
a program that causes a computer to perform an information processing method including:
performing, by a speaker array including a plurality of speakers, wavefront synthesis by using an output of the plurality of speakers; and
presenting, by a presentation unit, visual information indicating a state of waves on a wavefront formed in the wavefront synthesis, or presenting visual information based on positional information of a virtual sound image that has been formed in a position that is different from a vicinity of the speaker array in the wavefront synthesis.

BRIEF DESCRIPTION OF DRAWINGS

FIGS. 1A and 1B are diagrams that are referred to in explaining processing performed in an information processing apparatus that achieves a wavefront synthesis technique.

FIGS. 2A to 2C are diagrams that are referred to in explaining the wavefront synthesis technique.

FIGS. 6A and 6B are diagrams that are referred to in explaining an outline of a second embodiment.

MODE FOR CARRYING OUT THE INVENTION

Figure 3:
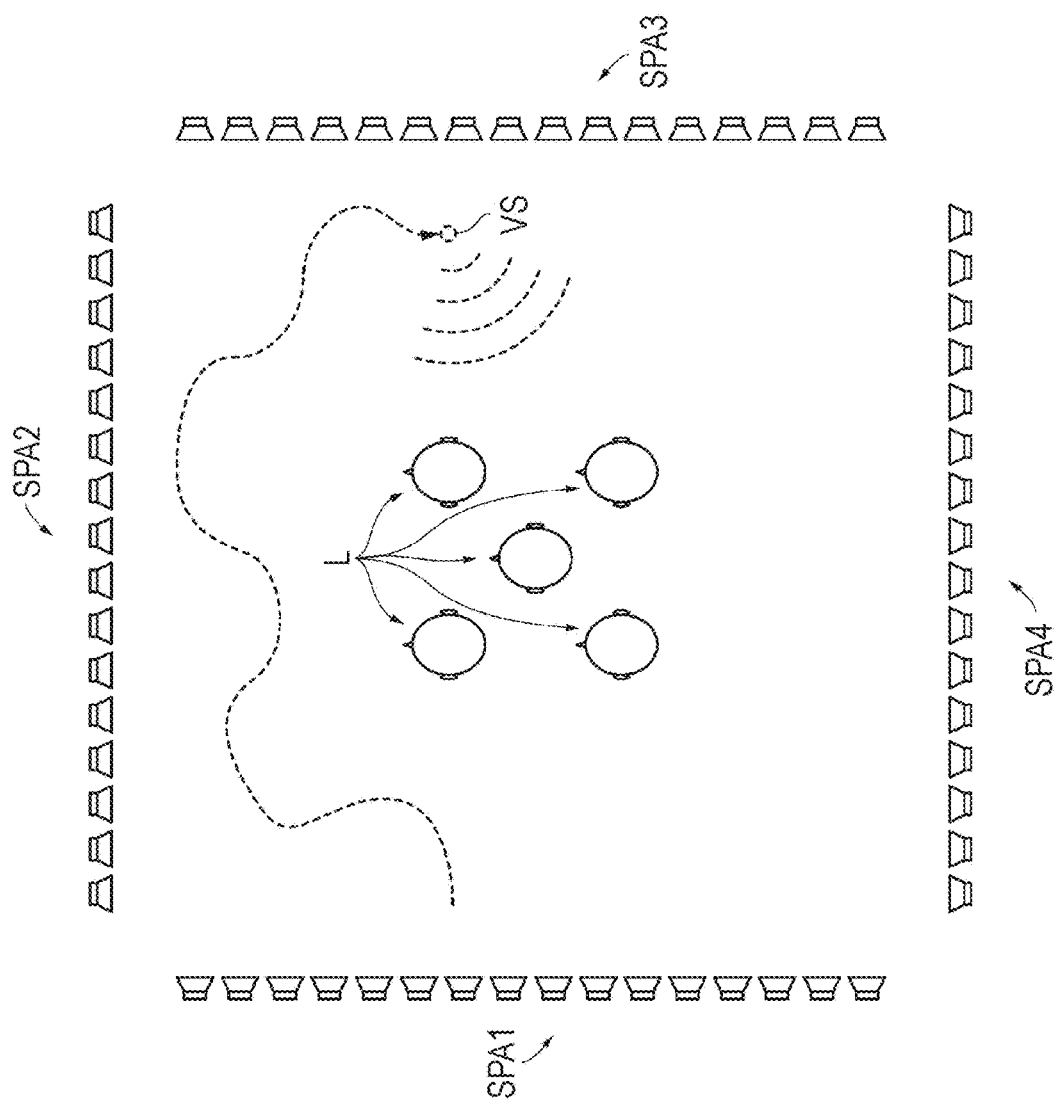
FIG. 3 is a diagram for explaining an example of a listener's experience that is obtained due to the wavefront synthesis technique.

Embodiments or the like of the present disclosure are described below with reference to the drawings. Note that description will be provided in the order described below.

<Wavefront synthesis technique>
<First embodiment>
<Second embodiment>
<Third embodiment>
<Variations>

Embodiments or the like that are described below are preferred specific examples of the present disclosure, and the content of the present disclosure is not limited to these embodiments or the like.

<Wavefront Synthesis Technique>

First, an acoustic technique referred to as a wavefront synthesis technique (hereinafter also referred to as a wavefront synthesis system) is described in order to make the present technology easily understandable. In recent years, the wavefront synthesis technique that enables new acoustic experience by using a speaker array including multichannel speakers has been attracting attention. This wavefront synthesis technique is a technique for physically controlling wavefronts of sound in a space by controlling an amplitude and a phase of each of the speakers of a speaker array.

Processing performed in an information processing apparatus that achieves the wavefront synthesis technique is schematically described with reference to FIGS. 1A and 1B. Sound source data is input to the information processing apparatus. Sound source metadata includes sound data itself and metadata describing a reproduction position or the like of the sound data. Such sound source data is also referred to as object audio, and is specified for each object (for example, each instrument, each animal, or the like) that corresponds to a sound source. The information processing apparatus to which the sound source data has been input calculates a reproduction signal. For example, the information processing apparatus compares the reproduction position included in the sound source data with a position of a speaker array in real time, and calculates which speaker will reproduce sound data of each individual object with what amplitude, in what phase, or the like. Therefore, the information processing apparatus obtains a speaker signal for driving a speaker. The obtained speaker signal is reproduced by a corresponding speaker. A synthetic sound field is formed by sound reproduced by speakers, and sound is reproduced according to wavefront synthesis.

One example of acoustic experience that is enabled by the wavefront synthesis technique is that a listener can perceive a virtual sound image that pops out of a speaker. Here, as illustrated in FIG. 2A, a case where sound is desired to be emitted from a position in front of a speaker (a position closer to a listener) is examined. Normally, in a surround-sound system serving as an example of an acoustic system using multichannel speakers, a listener that has heard sound emitted from a speaker naturally feels that the sound has been emitted from a position of the speaker. Furthermore, as illustrated in FIG. 2B, in stereo reproduction using 2-channel speakers, wavefronts of sound interfere with each other, and a non-uniform sound field is formed. Note that different shades of color in FIG. 2B indicate a difference in sound pressure, and a deeper color indicates a higher level of sound pressure. The similar is applied to other drawings.

However, by employing the wavefront synthesis technique, an amplitude and a phase of a signal of sound emitted from each of the speakers are appropriately controlled, and therefore a wavefront indicating as if an object (a virtual sound image) that emits sound is present in front of the speakers can be physically generated. Therefore, as illustrated in FIG. 2C, a listener perceives as if sound is emitted from a position in front of the speakers. Note that the wavefront synthesis technique also enables a virtual sound image to be disposed behind the speakers.

In general, this phenomenon is expressed as "a virtual sound image is localized in front of speakers" or the like. A technique for disposing a virtual sound image that pops out of a position that is different from actual positions of speakers is one example of experience that is enabled by the wavefront synthesis technique, and such new acoustic experience can be considered to open up experience possibilities of art works or attractions of amusement facilities, or the like. For example, as schematically illustrated in FIG. 3, speaker arrays SPA1 to SPA4 including multichannel speakers are disposed to surround a plurality of listeners L. Amplitudes and phases of signals of sound emitted from the individual speakers of the speaker arrays SPA1 to SPA4 are controlled in real time, and therefore a virtual sound image VS can be localized in an appropriate position in such a way that the listeners L can hear sound from various directions.

The wavefront synthesis technique enables an acoustic space to be generated as if an object that emits sound is present in an area within a space where nothing is physically present. Therefore, the wavefront synthesis technique is also referred to as sound holography or the like. The wavefront synthesis technique enables an experiencing person to acquire a real existence feeling and a realistic feeling in such a way that something is present in a space where nothing is present. It can be considered that experience, such as a real existence feeling, that can be acquired due to the wavefront synthesis technique can be further expanded, if a visual effect is provided in addition to sound reproduction according to the wavefront synthesis technique. For example, an effect of lighting up a position of a virtual sound image enables a listener to further acquire a localization feeling of the virtual sound image. Furthermore, the wavefront synthesis technique uses a large number of speakers to visually reproduce (visualize) a state of sound waves that would fail to be generated by using a single speaker, and therefore a listener can grasp a virtual sound image by using both hearing and sight.

It can be considered that a visual effect of visualizing sound waves does not only expand experience of a listener, but is also useful in introducing or installing a wavefront synthesis system. Visualization of sound waves enables a system installing person to recognize what wavefront will be generated by the wavefront synthesis system, and this assists a work relating to installation of calibration or the like.

Embodiments or the like of the present technology that has been created in view of these points are described in detail below.

First Embodiment

[Outline]

Next, a first embodiment is described. First, an outline of the embodiment is described with reference to FIG. 4. Note that the outline described below of the embodiment can be applied to second and third embodiments.

Figure 4:
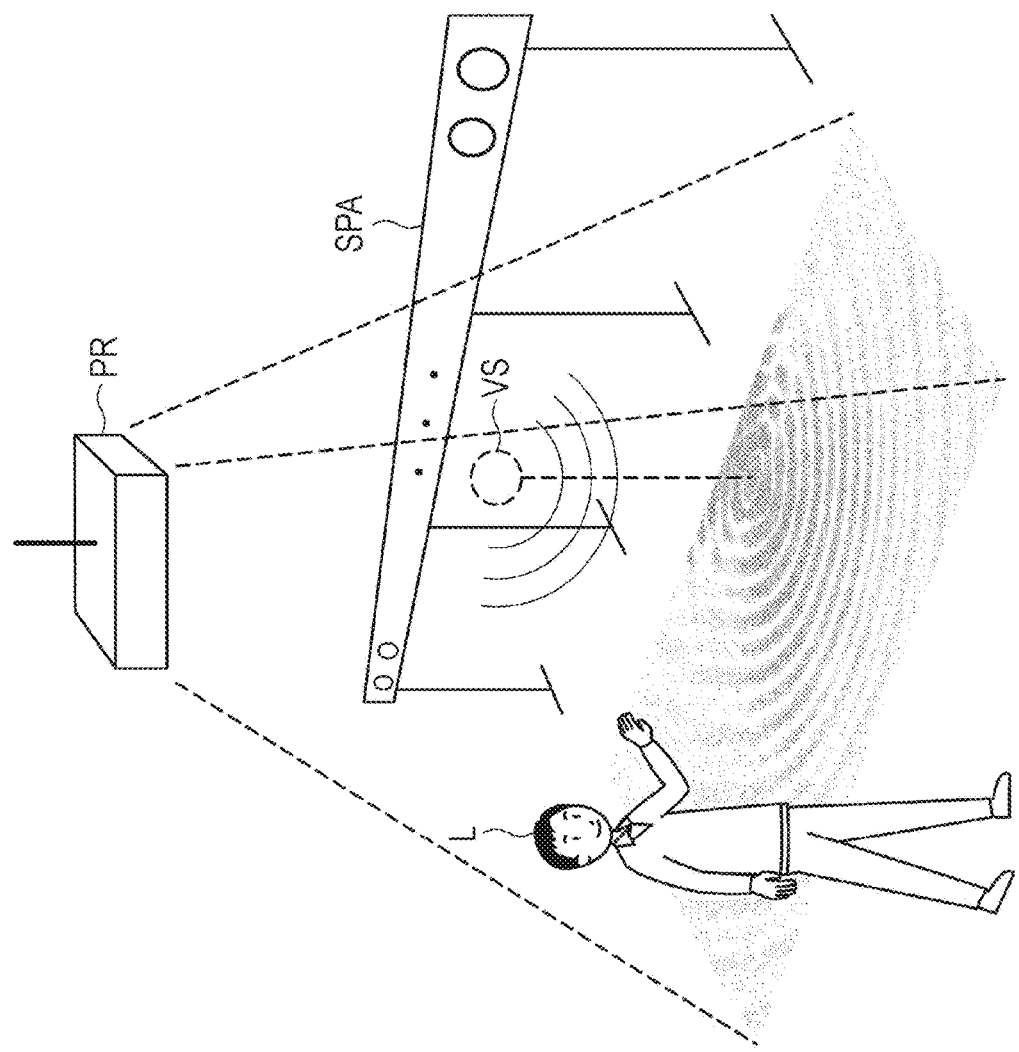
FIG. 4 is a diagram for explaining an outline of an embodiment.

As illustrated in FIG. 4, a speaker array SPA is disposed in a certain space. A listener L is present in front of the speaker array SPA (in a sound emission direction). Sound is reproduced according to the wavefront synthesis technique by the speaker array SPA, and a virtual sound image VS is localized, for example, in front of the speaker array SPA (in a direction closer to the listener L).

In an upper portion of the space illustrated in FIG. 4, for example, a projection device PR that conducts a projection display is provided. The projection device PR presents the listener L with a video of waves on a wavefront formed in wavefront synthesis, for example, by conducting a projection display of the video on a floor. The listener L can view the video of the waves on the wavefront that has been displayed on the floor. Moreover, a realistic feeling or the like that has never been experienced, as described above, can be acquired in combination with the sound (for example, music) reproduced by the speaker array SPA. Note that the video of the waves is a video including peaks and bottoms that expand two-dimensionally. Furthermore, the waves in the video may be displayed to have colors, different shades of color, or the like according to a sound pressure distribution. For example, a portion having a higher sound pressure may be displayed in red, and a display may be conducted in such a way that color changes from yellow to blue as sound pressure decreases. Furthermore, for example, a portion having a higher sound pressure may be displayed in a deeper color, and a display may be conducted in such a way that color becomes lighter as sound pressure decreases.

[Configuration Example of Information Processing Apparatus]

Figure 5:
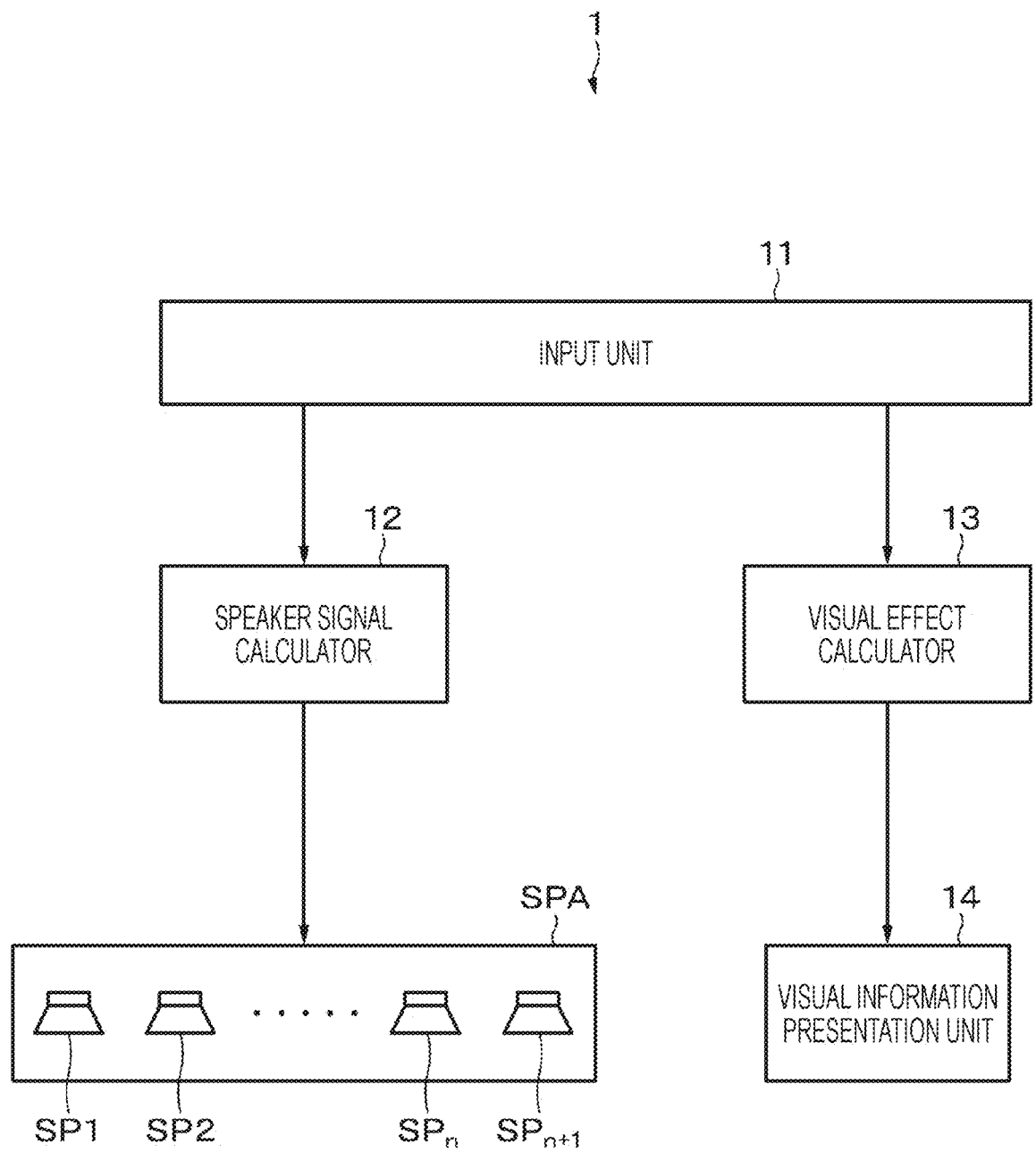
FIG. 5 is a block diagram illustrating a configuration example of an information processing apparatus according to a first embodiment.

Next, a configuration example of an information processing apparatus according to the first embodiment (an information processing apparatus 1) is described. FIG. 5 is a block diagram illustrating the configuration example of the information processing apparatus 1. The information processing apparatus 1 includes an input unit 11, a speaker signal calculator 12, a visual effect calculator 13, a visual information presentation unit 14, and a speaker array SPA.

The input unit 11 is an interface that is provided between the information processing apparatus 1 and an external device. Sound source data is input via the input unit 11. The sound source data may be input to the input unit 11 via a network such as the Internet or a local area network (LAN), or the sound source data may be input to the input unit 11 via a recording medium such as a semiconductor memory or an optical disk.

In the first embodiment, it is assumed that sound source data that includes metadata describing a sound source position or the like of each object and sound data of each of the objects is input to the input unit 11.

The speaker signal calculator 12 calculates and determines a speaker SP that will reproduce the sound data from among individual speakers SP that are included in the speaker array SPA, or an amplitude, a phase, or the like of the sound data that will be reproduced by the speaker SP, on the basis of the content of the metadata included in the sound source data. Stated another way, the speaker signal calculator 12 functions as an object audio renderer. The speaker signal calculator 12 appropriately converts a digital signal of the calculated speaker signal into an analog signal, and supplies the analog signal to the speaker array SPA. The speaker signal drives a corresponding speaker SP, and sound that corresponds to sound data of an object is reproduced according to the wavefront synthesis technique by the speaker array SPA.

The visual effect calculator 13 performs various types of calculation for providing a visual effect based on the wavefront synthesis technique. In the first embodiment, the sound source data is supplied from the input unit 11 to the visual effect calculator 13. The visual effect calculator 13 analyzes the sound source data, and generates control information for presenting a sound image position of each object, that is, a portion of a position that corresponds to a virtual sound image. Then, the visual effect calculator 13 supplies the control information to the visual information presentation unit 14.

The visual information presentation unit 14 presents visual information based on positional information of a virtual sound image to be formed in a position that is different from the vicinity of the speaker array SPA in wavefront synthesis, in accordance with the control information supplied from the visual effect calculator 13. Here, the visual information is information that can be visually recognized. Furthermore, the vicinity of the speaker array SPA means the speaker array SPA itself, or a range in which a distance between the speaker array SPA and a virtual sound image is less than or equal to a predetermined value. The visual information presentation unit 14 may be a device that conducts a projection display, may be a device that includes a plurality of light emitting diodes (LEDs) and a control circuit that controls light emission of the plurality of LEDs, or may be a display device.

The speaker array SPA includes a plurality of speakers SP ($SP_1$, $SP_2$, . . . , $SP_n$, and $SP_{n+1}$), and performs wavefront synthesis by using an output from the plurality of speakers SP. Note that, in a case where individual speakers do not need to be distinguished from each other, the term "speaker SP" is appropriately used. The number of speakers SP can be set to an arbitrary number (for example, about 500).

[Operation Example of Information Processing Apparatus]

Next, an operation example of the information processing apparatus 1 is described. Sound source data is supplied to the input unit 11 of the information processing apparatus 1. The sound source data is supplied to each of the speaker signal calculator 12 and the visual effect calculator 13. The speaker signal calculator 12 calculates a speaker signal to be reproduced by the speaker array SPA, on the basis of the sound source data. The speaker signal is supplied to the speaker array SPA, and the speaker signal is reproduced by the speaker array SPA. By doing this, a virtual sound image is localized in a three-dimensional position that is specified by metadata included in the sound source data.

On the other hand, the sound source data is supplied from the input unit 11 to the visual effect calculator 13. The visual effect calculator 13 analyzes metadata of the sound source data to determine a position of a virtual sound image, and generates control information for presenting a portion of a position that corresponds to the virtual sound image. Then, the visual effect calculator 13 supplies the control information to the visual information presentation unit 14. The visual information presentation unit 14 according to the first embodiment presents a video based on positional information of a virtual sound image to be formed in a position that is different from the vicinity of the speaker array SPA in wavefront synthesis.

Here, "based on positional information of a virtual sound image" means to be based on a position of a virtual sound image or a distance between the virtual sound image and the speaker array SPA. Accordingly, a visual effect obtained by presenting visual information based on positional information of a virtual sound image is distinguished, for example, from the visual effects described below.

Visual effect is fixed. Stated another way, presenting the same visual effect regardless of a position of a virtual sound image or a distance between the virtual sound image and the speaker array SPA is distinguished from a visual effect obtained according to the present embodiment.

Visual effect is presented under the assumption that a distance between a virtual sound image and the speaker array SPA is 0, even if the distance is not 0. Specifically, lighting up the speaker array SPA itself as a position of a virtual sound image means presentation under the assumption of a distance of 0, and this is distinguished from a visual effect obtained according to the present embodiment.

Note that a distance between a virtual sound image and the speaker array SPA can be calculated, for example, as described below. Calculation described below as an example is performed, for example, by the visual effect calculator 13. For example, as in the present embodiment, in a case where metadata is input to the information processing apparatus 1, a distance between a virtual sound image and the speaker array SPA is calculated on the basis of the speaker array SPA and three-dimensional position data of the virtual sound image that is described in the metadata. Note that the specific content of the distance can be appropriately specified. For example, a distance to a point that is closest to a position of a virtual sound image on the speaker array SPA may be specified as a distance between the virtual sound image and the speaker array SPA. Alternatively, a distance between a specified portion on the speaker array SPA (for example, the center of the speaker array SPA in which a plurality of speakers SP linearly extends) and a virtual sound image may be specified as a distance between the virtual sound image and the speaker array SPA.

Furthermore, even in a case where metadata is not input to the information processing apparatus 1, a distance between a virtual sound image and the speaker array SPA can be estimated. An example of the method is described below.

A plurality of points is disposed as points in a space where a virtual sound image can be disposed. It is assumed that these points are:

$$p_1, p_2, p_3, \ldots, p_L, p_l \in \mathbb{R}^3.$$

It is assumed that a wavefront synthesis filter calculated from geometric disposition of the speaker array SPA at a time when a virtual sound image is disposed at each of the points described above is:

$w_1(k), w_2(k), w_3(k), \ldots, w_l(k) \in \mathbb{C}^Q$. Note that k indicates an index of frequency, and Q indicates the number of speakers.

Here, when it is assumed that a drive signal of a speaker SP (a speaker signal) is:

$d(k) \in \mathbb{C}^Q$, the optimization problem described below is solved:

$$X = \mathrm{argmin}_X \sum_k \|d(k) - [w_1(k), w_2(k), \ldots, w_L(k)]x(k)\|_2^2 + \lambda \sum_l \left(\sum_k |x_{l,k}|^2\right)^{\frac{1}{2}},$$

and then, $$x(1), x(2), \ldots, x(K), x(k) \in \mathbb{C}^L$$

is obtained. (A set of x(1), x(2), ..., x(K) is expressed as X.)

Here, $$x_{l,k} \in \mathbb{C}$$

is an l-th element of vector X(k). $\lambda$ is an appropriately set parameter. This optimization problem can be solved by using, for example, the M-FOCUSS algorithm. Details of the M-FOCUSS algorithm are disclosed in S. F. Cotter, B. D. Rao, K. Engan & K. Kreutz-Delgado, "Sparse solutions to linear inverse problems with multiple measurement vectors", IEEE Transactions on Signal Processing, 53(7), 2477-2488, 2005".

Here, assume that:

$$P_l = \Sigma_k |x_{l,k}|^2.$$

When pieces of $P_l$ are arranged in a descending order, $p_l$ (a point in the space) that corresponds to a larger l of $P_l$ is a position of the virtual sound image. In a case where it can be considered that a plurality of virtual sound images is present, some largest pieces of $P_l$ are extracted, and therefore a position of the plurality of virtual sound images can be estimated. A distance between a virtual sound image and the speaker array SPA can be calculated from a position of the virtual sound image and geometric disposition of the speaker array SPA.

[Examples of Visual Information]

Examples of visual information that is presented to a listener L by the visual information presentation unit 14 according to the present embodiment is described. The video described below as an example is presented to the listener L, and therefore a visual effect, such as lighting up a position of a virtual sound image, can be achieved. Note that the visual information presentation unit 14 has a configuration (an LED or the like) that corresponds to the example described below.

The visual information is presented in at least one predetermined position of an upper side (for example, a ceiling), a lower side (for example, a floor), or a space (for example, between the ceiling and the floor) relative to a sound emission direction of the speaker array SPA. Specific examples are described below.

For example, lights such as an LED serving as an example of a light emitting element are two-dimensionally disposed in the floor and the ceiling. A light that corresponds to a position of a virtual sound image is put on, and therefore visual information is presented.

For example, lights such as an LED are two-dimensionally disposed in the floor and the ceiling. A position of a light to be put on is changed according to a distance between a virtual sound image and the speaker array SPA, and therefore visual information is presented.

For example, lights such as an LED are disposed in both the floor and the ceiling, and a position of a light to be put on and an amount of light are changed according to a position of a virtual sound image or a distance between the virtual sound image and the speaker array SPA. Therefore, visual information is presented. Specifically, in a case where a position of a virtual sound image is located on the space, lights that are located in an upward/downward direction of the position of the virtual sound image are put on. At this time, in a case where the position of the virtual sound image is located closer to the upper side, a luminance of an upper-side light may be increased, and a luminance of a lower-side light may be decreased. In contrast, in a case where the position of the virtual sound image is located closer to the lower side, the luminance of the upper-side light may be decreased, and the luminance of the lower-side light may be increased. By doing this, a listener L can easily recognize the position of the virtual sound image on the space.

For example, a string-shaped object including a plurality of LEDs is prepared, and a plurality of objects is hung from the ceiling. Then, a specified LED is put on in accordance with a position of a virtual sound image or a distance between the virtual sound image and the speaker array, and therefore visual information is presented. By doing this, the position of the virtual sound image that is present on the space can be presented.

For example, a certain object is projected and displayed on both the floor and the ceiling in accordance with a position of a virtual sound image or a distance between the virtual sound image and the speaker array SPA, by using a projector. Therefore, visual information is presented.

For example, a unit (for example, a spherical object) for which a height changes under the control of the visual information presentation unit 14 is disposed. The height of the unit is increased or decreased in accordance with a position of a virtual sound image or a distance between the virtual sound image and the speaker array SPA. Therefore, visual information is presented. The unit may emit light, or may not emit light.

For example, a plurality of devices that emits a laser beam is disposed in at least one of the floor or the ceiling. Then, a laser beam is emitted from a predetermined device in accordance with a position of a virtual sound image or a distance between the virtual sound image and the speaker array SPA. Therefore, visual information is presented.

Note that a position of a virtual sound image according to the wavefront synthesis technique can change in real time. Accordingly, a position of visual information to be presented can also change in real time. Furthermore, depending on content to be reproduced, a plurality of objects (for example, for each instrument or for each animal) is included in some cases. In these cases, visual information based on a virtual sound image or the like for each of the objects may be presented. The visual information based on the virtual sound image or the like for each of the objects may be presented distinguishably, by changing color, display content, or the like.

According to the first embodiment described above, presentation is made in accordance with a position of a virtual sound image or a distance between the virtual sound image and a speaker array. Therefore, experience with a realistic feeling can be provided to a listener, and new acoustic experience can be created.

Second Embodiment

Next, a second embodiment is described. Note that the matters described in the first embodiment can be applied to the second embodiment, unless otherwise specified. Furthermore, a duplicate description of a configuration that is the same as or similar to the configuration described in the first embodiment is appropriately omitted.

[Outline]

First, an outline of the second embodiment is described with reference to FIG. 6. In the present embodiment, a case where L sound sources (objects) are present is examined. For example, as illustrated in FIG. 6A, a case where the sound sources are a trumpet and a guitar is examined. Needless to say, the sound source is not limited to sound of an instrument, and any sound source such as natural sound or a cry of an animal may be employed. It is assumed that a sound source position at each time of a sound source is $r_l(t)$, and a signal of each of the sound sources is $s_l(t)$. Metadata indicating a sound source position and sound data of each of the sound sources are included in sound source data of each of the sound sources.

Then, as illustrated in FIG. 6B, a wavefront image indicating a state of waves on a wavefront is generated on the basis of the sound source data of each of the sound sources. For example, a wavefront video is generated by continuously reproducing generated wavefront images, and this wavefront video is presented to a listener L as visual information indicating a state of waves on a wavefront formed in wavefront synthesis.

[Configuration Example of Information Processing Apparatus]

Figure 7:
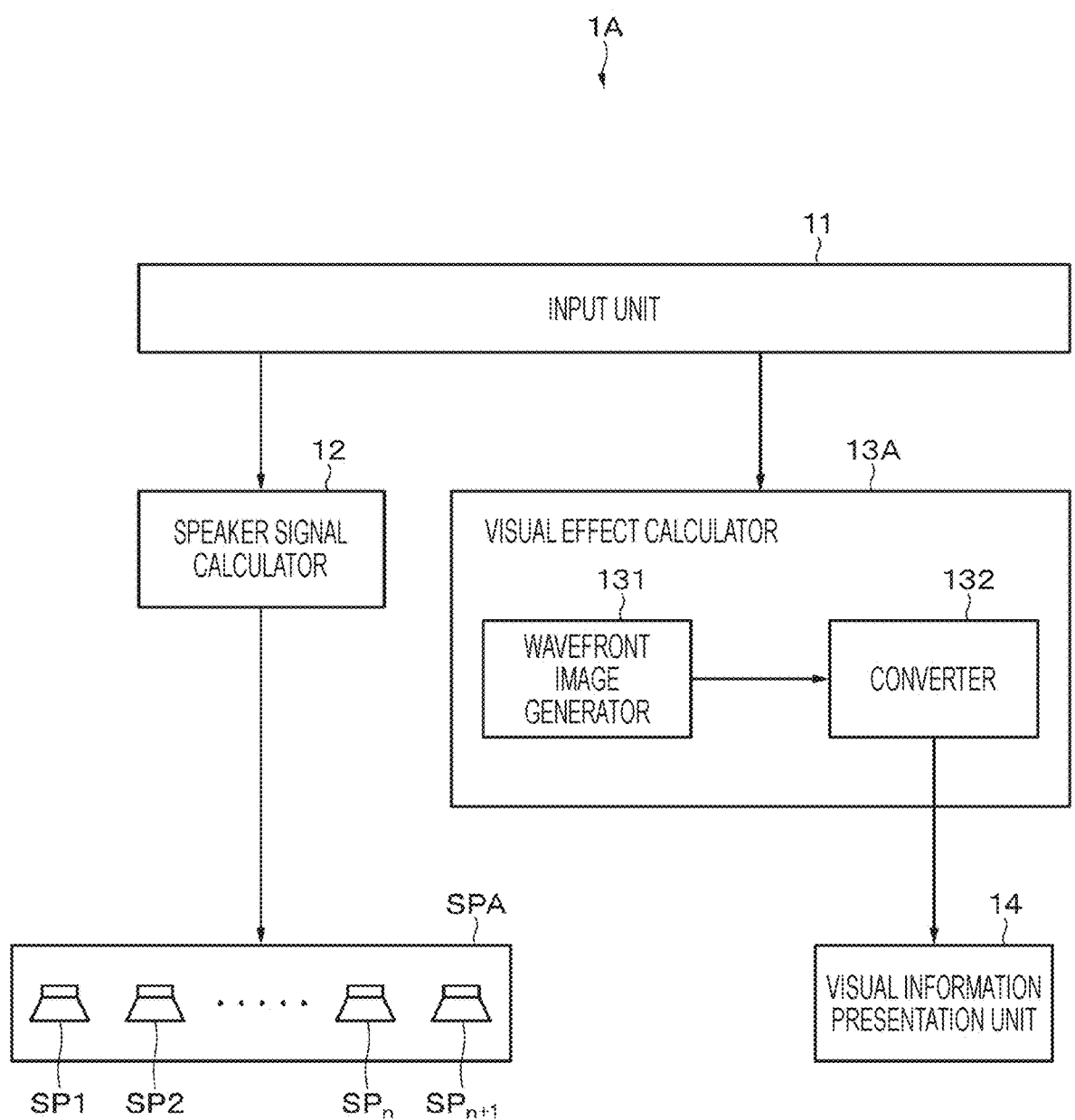
FIG. 7 is a block diagram illustrating a configuration example of an information processing apparatus according to the second embodiment.

Next, a configuration example of an information processing apparatus according to the second embodiment (an information processing apparatus 1A) is described. FIG. 7 is a block diagram illustrating a configuration example of the information processing apparatus 1A. The information processing apparatus 1A includes a visual effect calculator 13A in addition to an input unit 11, a speaker signal calculator 12, a visual information presentation unit 14, and a speaker array SPA.

The input unit 11, the speaker signal calculator 12, the visual information presentation unit 14, and the speaker array SPA have been described in the first embodiment, and therefore a duplicate description is omitted. Note that, in the second embodiment, a case where sound source data of each sound source is input to the input unit 11 is assumed.

(Visual Effect Calculator)

The visual effect calculator 13A in the information processing apparatus 1A is described. The visual effect calculator 13A includes a wavefront image generator 131 and a converter 132. The wavefront image generator 131 generates a wavefront image on the basis of metadata of a sound source. The converter 132 generates a wavefront video by using wavefront images generated by the wavefront image generator 131. Note that the converter 132 also generates control information for reproducing the wavefront video. The converter 132 outputs the wavefront video and the control information to the visual information presentation unit 14. The visual information presentation unit 14 conducts a projection display or the like in accordance with the control information to reproduce the wavefront video.

An example of a method for generating a wavefront image that is performed by the wavefront image generator 131 is described. When metadata $\{r_l(t), s_l(t)\}$ of each of the sound sources is obtained, a sound pressure distribution $P(r, t)$ in a space that is generated from the metadata can be calculated according to Formula 1 described below.

$$P(r, t) = \sum_l \int_{-\infty}^{t} g(r - r_l(\tau), t - \tau)\hat{s}_l(\tau)d\tau \qquad \text{[Formula 1]}$$

Note that it is known that the wavefront synthesis system fails to reproduce sound waves in the entire frequency band. In particular, in a high frequency band, spacial aliasing occurs, and an actually generated wavefront is completely different from a desired wavefront. Accordingly, in the present embodiment, a frequency threshold $f_{thr}$ is provided, and a wavefront image of only sound waves in a frequency band that is less than or equal to the frequency threshold is generated. In Formula 1, $$\hat{s}_l$$

is a signal of a sound source for which a band is limited by using the frequency threshold $f_{thr}$.

Information obtained according to Formula 1 described above is a sound pressure distribution on the space. Therefore, a wavefront image can be obtained by conducting a colormap display (a colored display) or the like of a value of sound pressure or a range of the value. As described above, a wavefront image generated by the system at each time can be obtained from metadata of each of the sound sources.

Figure 8:
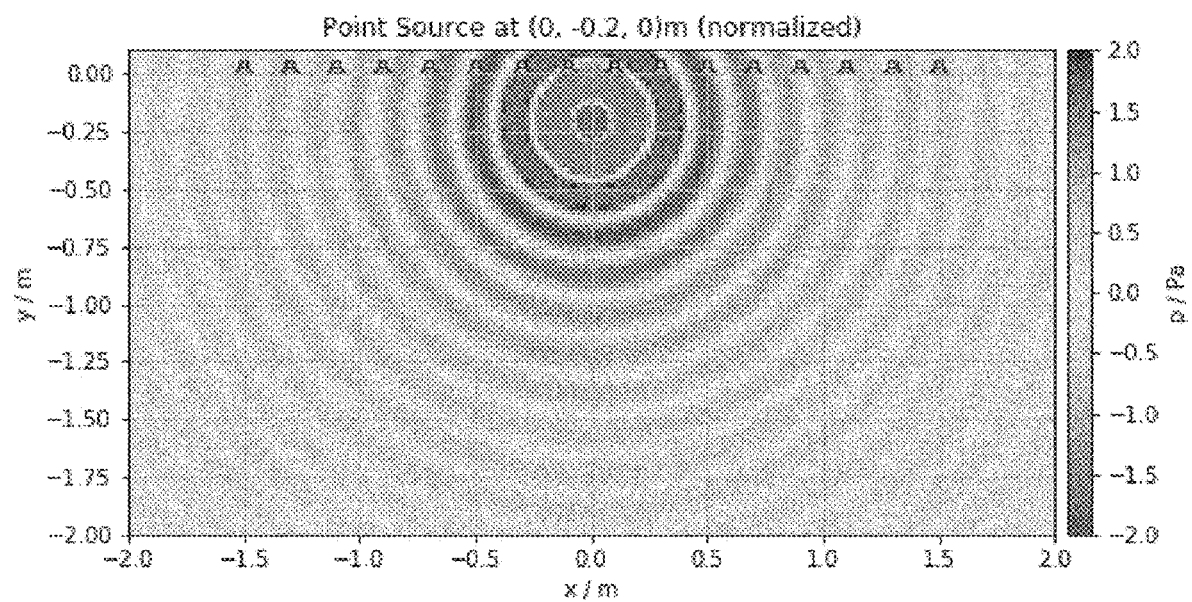
FIG. 8 is a diagram illustrating an example of a wavefront image.

FIG. 8 is a diagram illustrating an example of a wavefront image. The wavefront image illustrated in FIG. 8 is an image obtained by conducting a colormap display of a sound pressure distribution in the space that has been generated from metadata of a sound source. A position of a virtual sound image of the wavefront image illustrated in FIG. 8 is [0, −0.2, 0]m, and a sound source signal is sine waves of 1000 Hz. The number of speakers SP is 16, and an element spacing between speakers SP is 0.2 m. As the position of the virtual sound image is closer, color is deeper.

[Operation Example of Information Processing Apparatus]

Next, an operation example of the information processing apparatus 1A according to the second embodiment is described. Sound source data is supplied to the input unit 11 of the information processing apparatus 1A. The sound source data is supplied to each of the speaker signal calculator 12 and the visual effect calculator 13. The speaker signal calculator 12 calculates a speaker signal to be reproduced by the speaker array SPA, on the basis of the sound source data. The speaker signal is supplied to the speaker array SPA, and the speaker signal is reproduced by the speaker array SPA. By doing this, a virtual sound image is localized in a three-dimensional position that is specified by metadata included in the sound source data.

On the other hand, the sound source data is supplied from the input unit 11 to the visual effect calculator 13A. The wavefront image generator 131 of the visual effect calculator 13A analyzes the sound source data to generate a wavefront image. The wavefront image generator 131 supplies the generated wavefront image to the converter 132. The converter 132 generates a wavefront video, for example, by combining wavefront images. Then, the converter 132 supplies the generated wavefront image to the visual information presentation unit 14.

The wavefront video is presented to a listener L by the visual information presentation unit 14. For example, a projection display of the wavefront video serving as an example of visual information is conducted in at least one of the floor or the ceiling. Note that, in a wavefront video, more specifically, presentation made to correspond to a sound pressure distribution, an appropriate method, such as coloring, different shades of color, a combination thereof, or a difference in intensity of vibration, can be employed.

According to the second embodiment described above, sound waves can be visualized. Furthermore, a real existence feeling or a realistic feeling of presence of a listener in a sound reproduction space can be improved.

[Variations of the Second Embodiment]

Variations of the second embodiment are described. As described above, a wavefront image at each time can be generated on the basis of sound source data. A wavefront video can be generated by continuously reproducing generated wavefront images. However, there is a possibility that a wavefront video obtained by only continuously reproducing wavefront images will be a video that is difficult for a listener to recognize. This is because speed at which a wavefront of sound propagates in the air is about 340 [m/s], and is too high for humans to visually recognize the wavefront.

Figure 9:
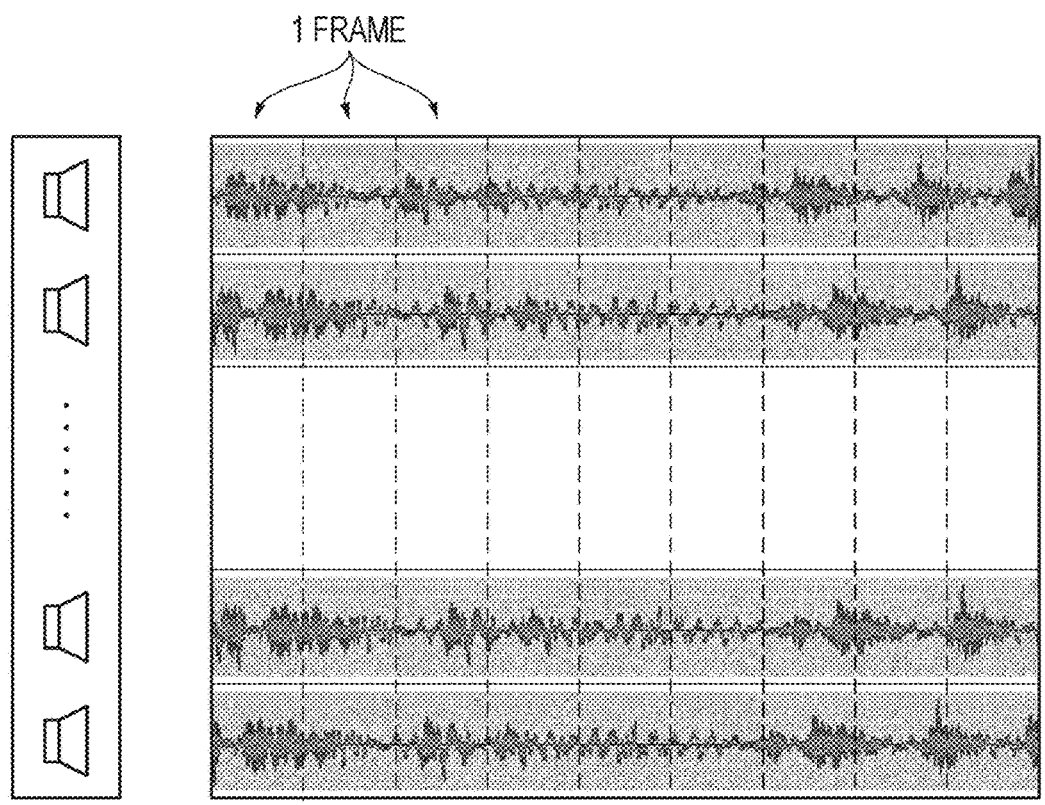
FIG. 9 is a diagram that is referred to in explaining processing for diving sound data into frames.

Accordingly, as an example, the processing described below may be performed. First, as schematically illustrated in FIG. 9, sound data of each sound source is divided into frames. A length of each of the frames can be set to an appropriate value, but is set to 200 ms in the present example. It is assumed that a length of a frame is T[s].

Figure 10:
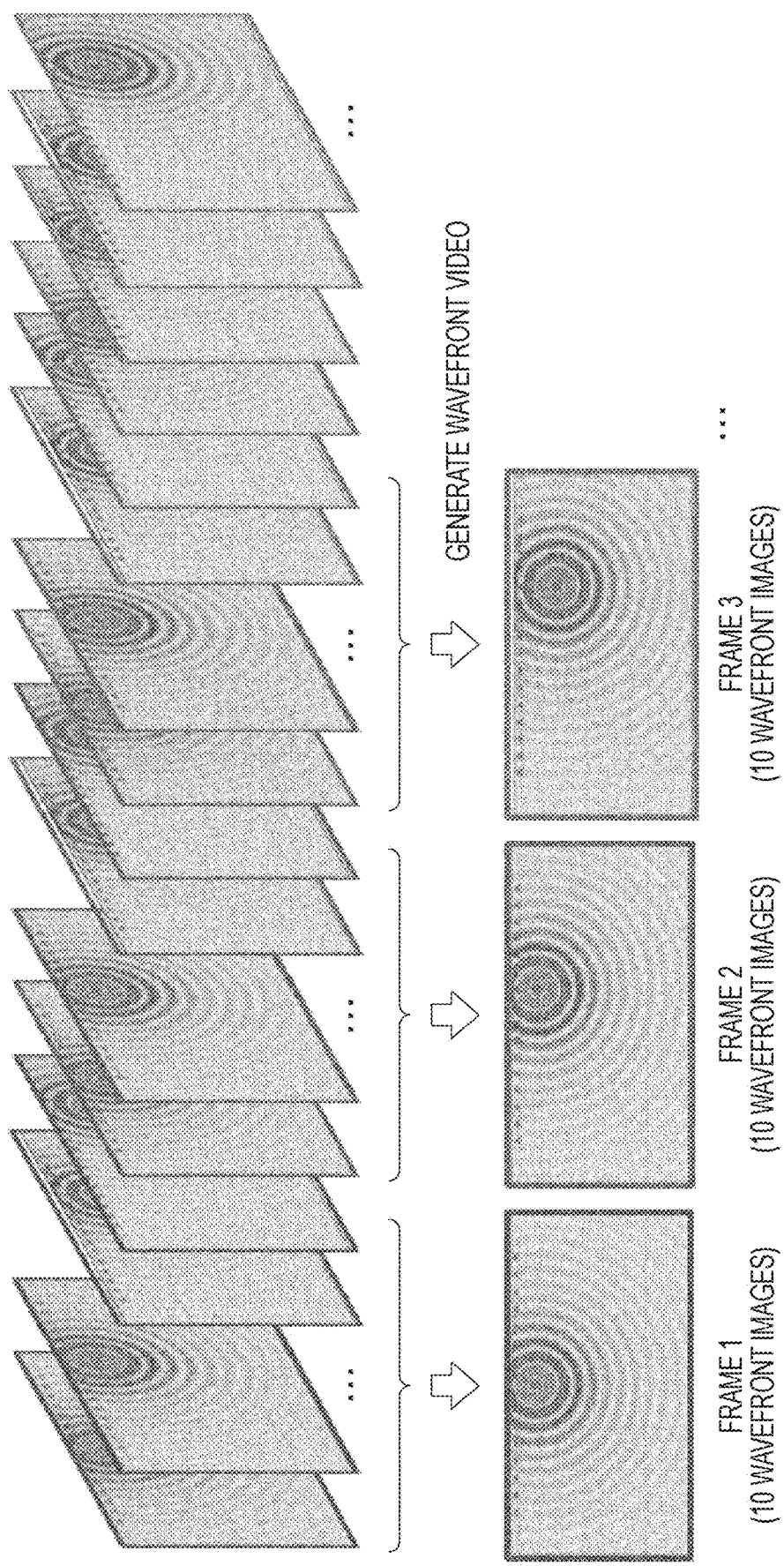
FIG. 10 is a diagram illustrating an example of consecutive wavefront images and an example of a wavefront video in frame units.

FIG. 10 is a diagram illustrating an example of consecutive wavefront images. Furthermore, FIG. 10 is a diagram illustrating an example of a wavefront video in frame units. As illustrated in FIG. 10, a wavefront video is generated in frame units. Note that FIG. 10 illustrates a wavefront video generated in frame units by using a single wavefront image in order to prevent complicated illustration. However, the wavefront video generated in frame units includes a plurality (for example, ten) of wavefront images.

Figure 11:
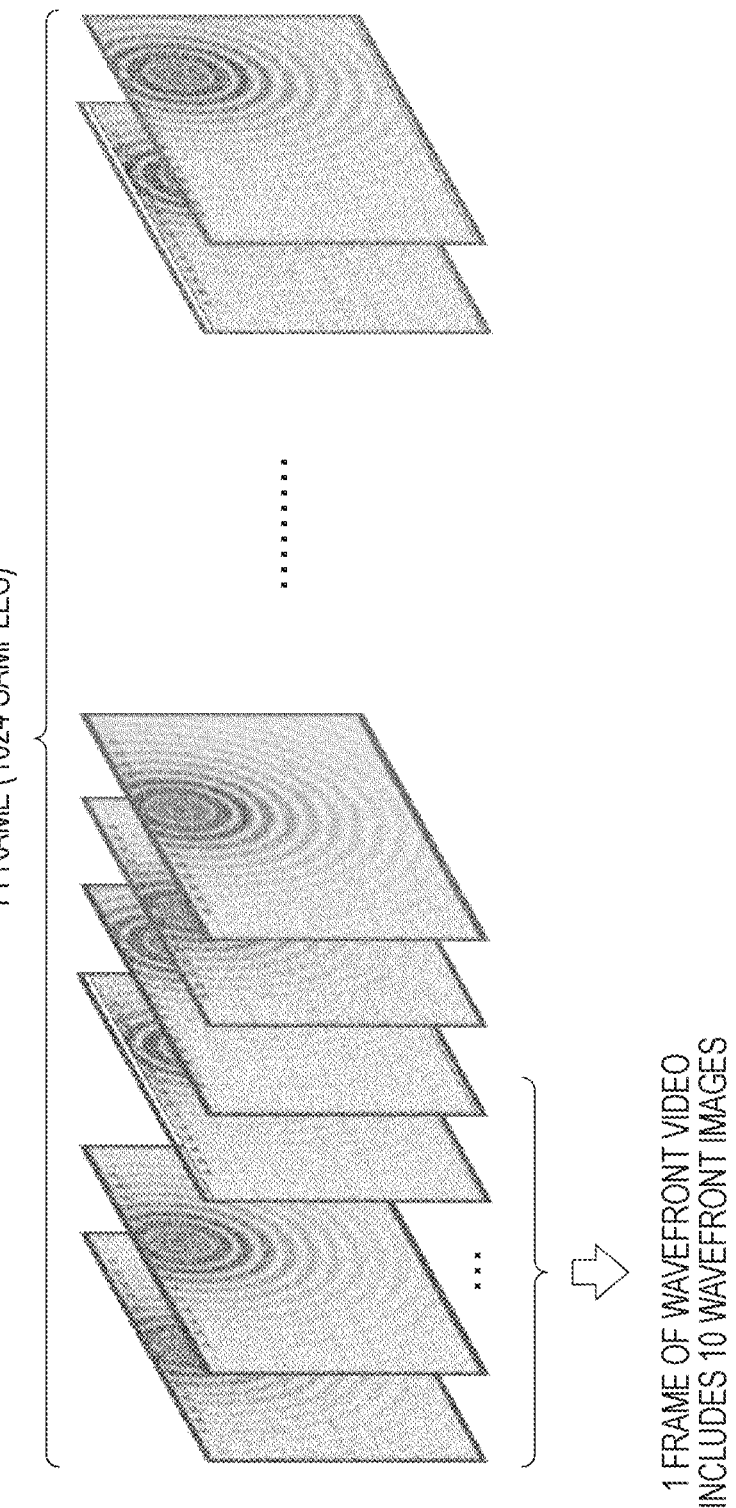
FIG. 11 is a diagram for explaining an example of a method for generating a wavefront video in frame units.

An example of a method for generating a wavefront video in frame units is described. As illustrated in FIG. 11, an example in which a single frame includes, for example, 1024 samples of sound data is examined. A wavefront image that corresponds to one sample of sound data can be generated. Therefore, in the present example, 1024 wavefront images are generated. A video obtained by multiplying a video in one frame by a multiplication rate that enables a listener L to easily recognize the video in the one frame in reproduction is generated. For example, from among the 1024 wavefront images, first 10 wavefront images are used (a multiplication rate of about 1/100 times (10/1024 times)), and one frame unit of wavefront video includes the 10 wavefront images. The one frame unit of wavefront video is reproduced. In practice, the 10 wavefront images of the 1024 wavefront images are reproduced, and therefore slow reproduction is performed. Note that the multiplication rate can be set to an appropriate value. It is assumed that a length of one frame unit of wavefront video is 2T[s].

Figure 12:
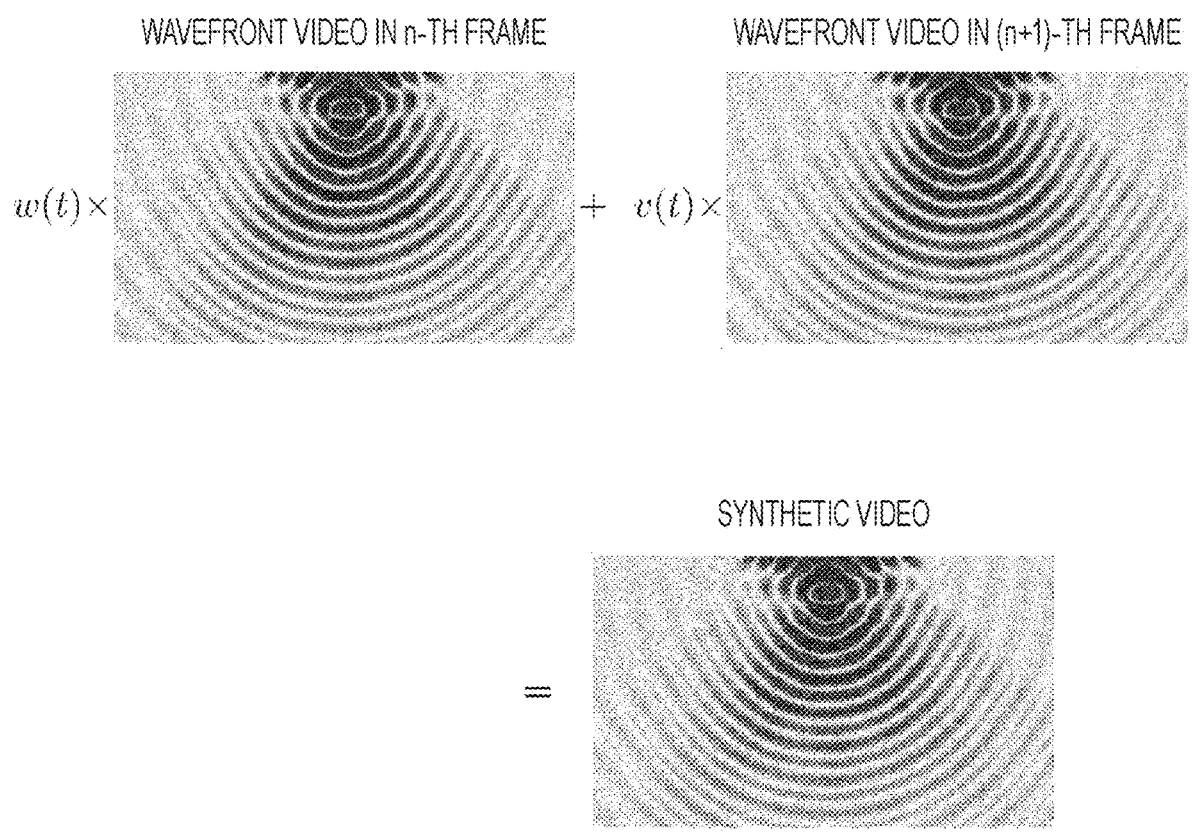
FIG. 12 is a diagram for explaining an example of fading processing.

Moreover, in the present embodiment, fading processing is performed in order to obtain a wavefront video that is easy for a listener L to perceive and is smoothly combined. As illustrated in FIG. 12, a wavefront video in an n-th frame is multiplied by a weighting coefficient w(t), a wavefront video in an (n+1)th frame is multiplied by a weighting coefficient v(t), and respective wavefront videos are added, and therefore a synthetic video is generated. The generated synthetic video is presented as visual information to a listener L.

Processing for generating a synthetic video is described in more detail. For example, it is assumed that a video in a q-th frame is Vq(t) (0≤t<2T). In this case, a synthetic video is reproduced as described below:

$$V_{sup}((q-1)T+t)=((1-t)/T)V_{q-1}(T+t)+(t/T)V_q(t),$$
$$(0 \leq t < T).$$

By presenting the synthetic video described above as visual information to a listener L, a wavefront video can be presented to be easily recognized by the listener L.

Third Embodiment

Next, a third embodiment is described. Note that the matters described in the first and second embodiments can be applied to the third embodiment, unless otherwise specified. Furthermore, a duplicate description of a configuration that is the same as or similar to the configuration described in the first or second embodiment is appropriately omitted.

[Configuration Example of Information Processing Apparatus]

Figure 13:
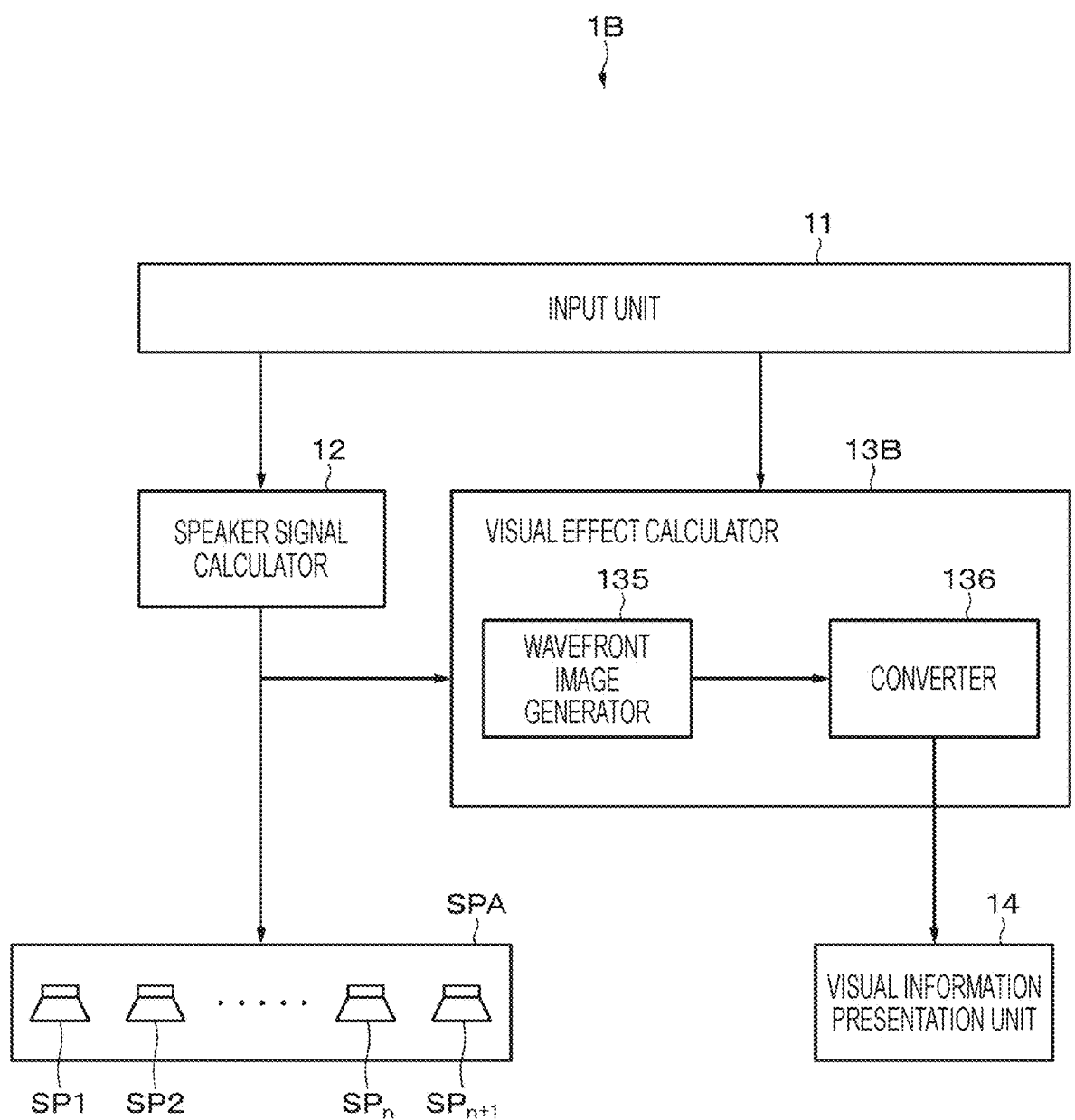
FIG. 13 is a block diagram illustrating a configuration example of an information processing apparatus according to a third embodiment.

FIG. 13 is a block diagram illustrating a configuration example of an information processing apparatus according to the third embodiment (an information processing apparatus 1B). The information processing apparatus 1B includes a visual effect calculator 13B in addition to an input unit 11, a speaker signal calculator 12, a visual information presentation unit 14, and a speaker array SPA. In the information processing apparatus 1B, a speaker signal calculated by the speaker signal calculator 12 is input to the visual effect calculator 13B.

The input unit 11, the speaker signal calculator 12, the visual information presentation unit 14, and the speaker array SPA have been described in the first embodiment, and therefore a duplicate description is omitted.

The visual effect calculator 13B includes a wavefront image generator 135 and a converter 136. In the third embodiment, a function of the wavefront image generator 135 is different from a function of the wavefront image generator 131. In the third embodiment, a case where metadata is not input to the input unit 11, that is, a case where only sound data is input, is assumed. Conceivable examples of a situation in which metadata is not obtained include a case where the wavefront synthesis system does not use metadata in the first place (a case where a signal of a microphone array is directly converted into a speaker signal and other cases), and a case where the wavefront synthesis system is formed as a black box, and the metadata fails to be accessed from the outside.

The wavefront image generator 135 generates a wavefront image on the basis of the speaker signal calculated by the speaker signal calculator 12. An example of this generation method is described.

It is assumed that a drive signal of each speaker is $x_n(t)$, and a signal obtained by limiting a band of the drive signal by using a frequency threshold $f_{thr}$ is:

$$\hat{x}_n(\tau).$$

A sound pressure distribution P(r, t) in the space can be calculated according to Formula 2 described below.

$$P(r, t) = \sum_n \int_{-\infty}^{t} g(r - r_n, t - \tau) x_n(\tau) d\tau \quad \text{[Formula 2]}$$

A wavefront image indicating a sound pressure distribution at each time can be obtained on the basis of a drive signal for each speaker SP at each time by using Formula 2.

Figure 14:
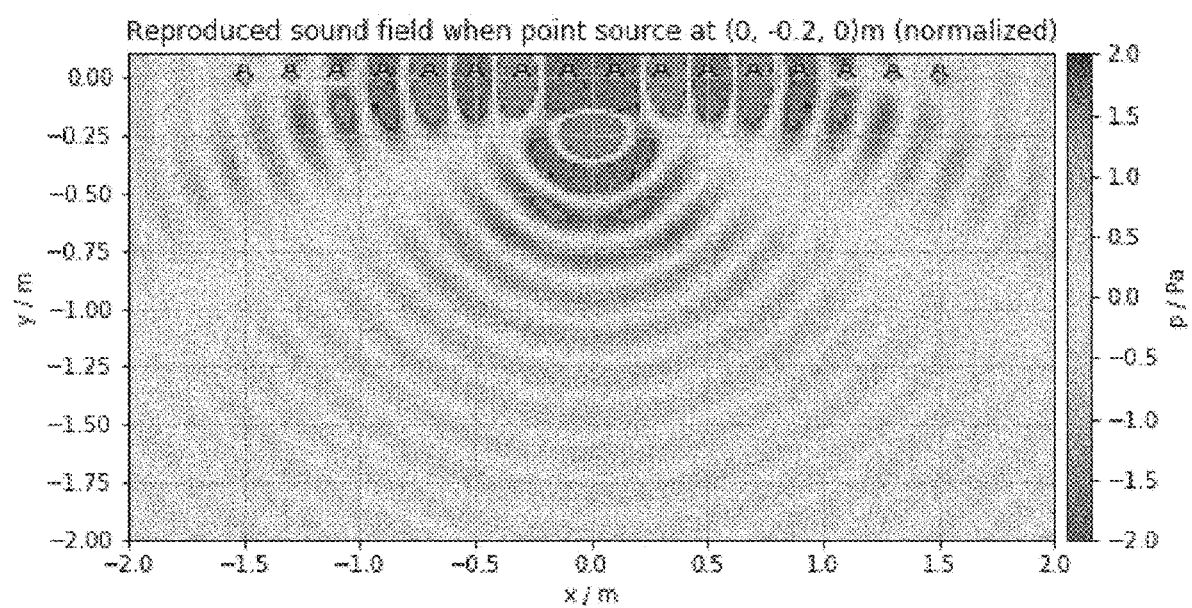
FIG. 14 is a diagram illustrating an example of a wavefront image.

FIG. 14 illustrates an example of a wavefront image obtained by conducting a colormap display of a sound pressure distribution in the space that has been generated from a drive signal of a speaker SP. In the illustrated example, a position of a virtual sound source is [0, −0.2, 0]m, and a sound source signal is sine waves of 1000 Hz. The number of speakers SP is 16, and an element spacing between speakers SP is 0.2 m. As the position of the virtual sound image is closer, color is deeper.

An operation of another configuration is similar to an operation in the information processing apparatus 1A according to the second embodiment. Schematically describing, the converter 136 generates a wavefront video on the basis of wavefront images generated by the wavefront image generator 131. The visual information presentation unit 14 performs processing for presenting the wavefront video.

Note that a generated wavefront image is slightly different between FIG. 8 described in the second embodiment and FIG. 14, although a position of a virtual sound source and a sound source signal are the same. Specifically, in FIG. 14, a portion where a wavefront has not been correctly reproduced is generated in a curved arc shape. In a case where a wavefront image is generated from a speaker signal, an area where a wavefront is correctly generated changes according to a calculation error of the speaker signal calculator 12, the number of speakers SP (the number of elements), or the like. In the example illustrated in FIG. 14, a correct wavefront is generated in an area at the center front of the speaker array SPA (near coordinates [0, −1.0, 0]m), but a correct wavefront is not generated in an area close to a predetermined speaker SP (for example, near coordinates [−1.5, −0.25, 0]m).

In such a case, correction processing for referring to a peripheral sound pressure distribution and interpolating a sound pressure in a portion where a wavefront has not been correctly reproduced may be performed. As correction processing, other known processing may be applied. The visual effect calculators 13A and 13B may include a correction processing unit that performs this correction processing.

Furthermore, whether or not correction processing will be performed may be selected according to the purposes of the wavefront synthesis system. For example, in a case where a user of the wavefront synthesis system desires to check an outline of a sound pressure distribution according to the wavefront synthesis system, it is not necessary to reproduce so accurate a sound pressure distribution. Accordingly, correction processing may be omitted. In contrast, in a case where the wavefront synthesis system is used for the purpose of entertainment in which a sound pressure distribution is visually presented to a listener L, it is preferable that an accurate sound pressure distribution be reproduced. In such a case, correction processing is performed.

According to the third embodiment described above, a wavefront image can be generated on the basis of a drive signal of a speaker SP even in a case where only the drive signal of the speaker SP is obtained. Then, a wavefront video based on wavefront images can be presented. For example, in a baseball stadium or the like, sound is collected by using multichannel microphones or the like, and sound data is obtained. The speaker signal calculator 12 calculates a speaker signal on the basis of the obtained sound data. By presenting a wavefront video based on the speaker signal, how a sound pressure distribution in the baseball stadium or the like looks like can also be presented. A sound pressure distribution in this case may be transmitted via a network, and may be displayed on a display that is disposed to be remote from the baseball stadium. The sound pressure distribution may be displayed to be superimposed onto a baseball relay broadcast or the like during broadcasting.

<Variations>

A plurality of embodiments of the present disclosure has been described in detail above. However, the content of the present disclosure is not limited to the embodiments described above, and various variations based on a technical idea of the present disclosure can be made. Variations are described below.

In the second and third embodiments described above, processing that is similar to processing according to the first embodiment, that is, presentation of visual information based on positional information of a virtual sound image, may be performed.

In the embodiments described above, metadata included in sound source data may describe other information. For example, in a case where sound data is plane waves, metadata may describe a direction of the plane waves.

Visual information obtained in processing according to the embodiments described above may be stored, or the visual information itself may be transmitted via a network or the like. For example, visual information together with a live video may be recorded in a recording medium, and the visual information may be presented simultaneously with reproduction of the live video.

The present disclosure can also be implemented by an apparatus, a method, a program, a system, or the like. For example, a program for achieving the functions described in the embodiments described above can be downloaded, and an apparatus that does not have the functions described in the embodiments downloads and installs the program. This enables the apparatus to perform the control described in the embodiments. The present disclosure can also be implemented by a server that distributes such a program. Furthermore, the matters described in respective embodiments or variations can be appropriately combined. Furthermore, the content of the present disclosure shall not be construed as being limited by the effects described herein as an example.

The present disclosure can also employ the configuration described below.

(1)

An information processing apparatus including:

a speaker array that includes a plurality of speakers, and performs wavefront synthesis by using an output of the plurality of speakers; and a presentation unit that presents visual information indicating a state of waves on a wavefront formed in the wavefront synthesis, or presents visual information based on positional information of a virtual sound image that has been formed in a position that is different from a vicinity of the speaker array in the wavefront synthesis.

(2)

The information processing apparatus described in (2), in which the visual information indicating the state of the waves on the wavefront formed in the wavefront synthesis includes a video of the waves on the wavefront.

(3)

The information processing apparatus described in (2), in which the video of the waves on the wavefront is generated by using a plurality of images of the waves on the wavefront, the plurality of images being generated on the basis of metadata included in a sound source.

(4)

The information processing apparatus described in (2), in which the video of the waves on the wavefront is generated by using a plurality of images of the waves on the wavefront, the plurality of images being generated on the basis of sound data included in a sound source.

(5)

The information processing apparatus described in (4), further including:

a correction processing unit that performs correction processing on each of the plurality of images of the waves on the wavefront.

(6)

The information processing apparatus described in any of (2) to (5), in which the video of the waves on the wavefront is generated by combining videos of the waves on the wavefront that each have been generated in predetermined frame units.

(7)

The information processing apparatus described in (6), in which each of the videos of the waves on the wavefront that each have been generated in the predetermined frame units is generated by slowly reproducing a plurality of images of the waves on the wavefront, the plurality of images being generated in the predetermined frame units.

(8)

The information processing apparatus described in (6) or (7), in which the video of the waves on the wavefront is generated by combining videos each obtained by weighting and adding the videos of the waves on the wavefront that each have been generated in the predetermined frame units.

(9)

The information processing apparatus described in any of (1) to (9), in which the positional information of the virtual sound image includes a position of the virtual sound image or a distance between the virtual sound image and the speaker array, and the presentation unit presents visual information that corresponds to the position of the virtual sound image, or visual information that corresponds to the distance between the virtual sound image and the speaker array.

(10)

The information processing apparatus described in (9), in which the presentation unit presents the visual information in at least one predetermined position of an upper side, a lower side, or a space relative to a sound emission direction of the speaker array.

(11)

The information processing apparatus described in (9), in which the presentation unit presents the visual information by conducting a projection display or causing a predetermined light emitting element to emit light.

(12)

The information processing apparatus described in any of (1) to (11), further including:

an input unit to which the sound source is input.

(13)

An information processing method including:

performing, by a speaker array including a plurality of speakers, wavefront synthesis by using an output of the plurality of speakers; and presenting, by a presentation unit, visual information indicating a state of waves on a wavefront formed in the wavefront synthesis, or presenting visual information based on positional information of a virtual sound image that has been formed in a position that is different from a vicinity of the speaker array in the wavefront synthesis.

(14)

A program that causes a computer to perform an information processing method including:

performing, by a speaker array including a plurality of speakers, wavefront synthesis by using an output of the plurality of speakers; and presenting, by a presentation unit, visual information indicating a state of waves on a wavefront formed in the wavefront synthesis, or presenting visual information based on positional information of a virtual sound image that has been formed in a position that is different from a vicinity of the speaker array in the wavefront synthesis.

REFERENCE SIGNS LIST 1, 1A, 1B Information processing apparatus
11 Input unit
12 Speaker signal calculator
13, 13A, 13B Visual effect calculator
14 Visual information presentation unit
131, 135 Wavefront image generator
132, 136 Converter
SP Speaker
SPA Speaker array

The invention claimed is:

1. An information processing apparatus comprising:

a speaker array that includes a plurality of speakers, and performs wavefront synthesis by using an output of the plurality of speakers; and circuitry configured to control presentation of visual information indicating a state of sound waves on a wavefront formed in the wavefront synthesis, or presentation of visual information based on positional information of a virtual sound image that has been formed in a position that is different from a vicinity of the speaker array in the wavefront synthesis, wherein the visual information relating to the sound waves or to the virtual sound image is projected by a projection device onto a surface in front of the speaker array as a projection display and wherein the projected visual information represents sound waves that emanate from a position on the surface aligned with a position of the virtual sound image.

2. The information processing apparatus according to claim 1,
wherein the visual information indicating the state of the waves on the wavefront formed in the wavefront synthesis includes a video of the waves on the wavefront.

3. The information processing apparatus according to claim 2,
wherein the video of the waves on the wavefront is generated by using a plurality of images of the waves on the wavefront, the plurality of images being generated on a basis of metadata included in a sound source.

4. The information processing apparatus according to claim 2,
wherein the video of the waves on the wavefront is generated by using a plurality of images of the waves on the wavefront, the plurality of images being generated on a basis of sound data included in a sound source.

5. The information processing apparatus according to claim 4,
wherein the circuitry is further configured to perform correction processing on each of the plurality of images of the waves on the wavefront.

6. The information processing apparatus according to claim 2,
wherein the video of the waves on the wavefront is generated by combining videos of the waves on the wavefront that each have been generated in predetermined frame units.

7. The information processing apparatus according to claim 6,
wherein each of the videos of the waves on the wavefront that each have been generated in the predetermined frame units is generated by slowly reproducing a plurality of images of the waves on the wavefront, the plurality of images being generated in the predetermined frame units.

8. The information processing apparatus according to claim 6,
wherein the video of the waves on the wavefront is generated by combining videos each obtained by weighting and adding the videos of the waves on the wavefront that each have been generated in the predetermined frame units.

9. The information processing apparatus according to claim 1,
wherein the positional information of the virtual sound image includes a position of the virtual sound image or a distance between the virtual sound image and the speaker array, and
the circuitry is configured to control presentation of visual information that corresponds to the position of the virtual sound image, or visual information that corresponds to the distance between the virtual sound image and the speaker array.

10. The information processing apparatus according to claim 9,
wherein the circuitry is configured to control presentation of the visual information in at least one predetermined position of an upper side, a lower side, or a space relative to a sound emission direction of the speaker array.

11. The information processing apparatus according to claim 1, wherein the visual information is projected onto a floor or a ceiling.

12. An information processing method executed by circuitry, the method comprising:
controlling wavefront synthesis by using an output of a speaker array including a plurality of speakers; and
controlling presentation of visual information indicating a state of sound waves on a wavefront formed in the wavefront synthesis, or presentation of visual information based on positional information of a virtual sound image that has been formed in a position that is different from a vicinity of the speaker array in the wavefront synthesis, wherein the visual information relating to the sound waves or to the virtual sound image is projected by a projection device onto a surface in front of the speaker array as a projection display and wherein the projected visual information represents sound waves that emanate from a position on the surface aligned with a position of the virtual sound image.

13. A non-transitory computer readable medium storing instructions that, when executed by processing circuitry, perform an information processing method comprising:
controlling wavefront synthesis by using an output of a speaker array including a plurality of speakers; and
controlling presentation of visual information indicating a state of sound waves on a wavefront formed in the wavefront synthesis, or presentation of visual information based on positional information of a virtual sound image that has been formed in a position that is different from a vicinity of the speaker array in the wavefront synthesis, wherein the visual information relating to the sound waves or to the virtual sound image is projected by a projection device onto a surface in front of the speaker array as a projection display and wherein the projected visual information represents sound waves that emanate from a position on the surface aligned with a position of the virtual sound image.

* * * * *